(12) United States Patent
Zhong et al.

(10) Patent No.: US 12,091,328 B2
(45) Date of Patent: Sep. 17, 2024

(54) HIGH-NICKEL SODIUM ION POSITIVE ELECTRODE MATERIAL AND PREPARATION METHOD THEREFOR AND BATTERY

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP RECYCLING TECHNOLOGY CO., LTD., Hubei (CN)

(72) Inventors: Yingsheng Zhong, Guangdong (CN); Haijun Yu, Guangdong (CN); Yinghao Xie, Guangdong (CN); Aixia Li, Guangdong (CN); Bin Li, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); YICHANG BRUNP RECYCLING TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/564,772

(22) PCT Filed: Aug. 31, 2022

(86) PCT No.: PCT/CN2022/116255
§ 371 (c)(1),
(2) Date: Nov. 28, 2023

(87) PCT Pub. No.: WO2023/109193
PCT Pub. Date: Jun. 22, 2023

(65) Prior Publication Data
US 2024/0270602 A1   Aug. 15, 2024

(30) Foreign Application Priority Data
Dec. 16, 2021   (CN) .......................... 202111540231.8

(51) Int. Cl.
*C01G 53/00* (2006.01)
*H01M 4/131* (2010.01)
*H01M 10/54* (2006.01)

(52) U.S. Cl.
CPC ............ *C01G 53/50* (2013.01); *H01M 4/131* (2013.01); *H01M 10/54* (2013.01);
(Continued)

(58) Field of Classification Search
CPC ...... C01G 53/50; H01M 4/131; H01M 10/54; C01P 2002/01; C01P 2004/03; C01P 2004/04; C01P 2006/40
See application file for complete search history.

(56) References Cited

U.S. PATENT DOCUMENTS

2016/0218363 A1   7/2016 Meng et al.

FOREIGN PATENT DOCUMENTS

CN   106684369 A   5/2017
CN   110808362 A   2/2020
(Continued)

OTHER PUBLICATIONS

Translation of CN 113258060 (Year: 2021).*
(Continued)

*Primary Examiner* — Daniel S Gatewood
(74) *Attorney, Agent, or Firm* — MYERS WOLIN, LLC

(57) ABSTRACT

Disclosed are a high-nickel sodium ion cathode material and a preparation method therefor and a battery, wherein a
(Continued)

chemical formula of the high-nickel sodium ion cathode material is $NaNi_aCo_bMn_cO_2 \cdot fCNP\text{---}Al/tMVO_x$, wherein $a+b+c=1$, $0.5 \leq a < 1$, $0 < b \leq 0.25$, $a/b \geq 2.5$, $0 < c \leq 0.3$, $0 < t \leq 0.1$, $0 < f \leq 0.1$, and M is at least one of sodium, copper, zinc, zirconium or ammonium.

17 Claims, 2 Drawing Sheets

(52) U.S. Cl.
CPC ...... *C01P 2002/01* (2013.01); *C01P 2004/03* (2013.01); *C01P 2004/04* (2013.01); *C01P 2006/40* (2013.01)

(56) References Cited

FOREIGN PATENT DOCUMENTS

| | | | | |
|---|---|---|---|---|
| CN | 112456567 A | | 3/2021 | |
| CN | 112928252 A | | 6/2021 | |
| CN | 113258060 A | * | 8/2021 | ........... C01G 53/006 |
| CN | 114400318 A | | 4/2022 | |
| WO | 2021/038263 A1 | | 3/2021 | |

OTHER PUBLICATIONS

International Search Report with the Written Opinion of the International Searching Authority issued by the China National Intellectual Property Administration for International Patent Application No. PCT/CN2022/116255, mailed on Nov. 28, 2022, with an English translation.

* cited by examiner

HIGH-NICKEL SODIUM ION POSITIVE ELECTRODE MATERIAL AND PREPARATION METHOD THEREFOR AND BATTERY

CROSS-REFERENCE TO RELATED APPLICATION

This application is a national stage filing under 35 U.S.C. § 371 of international application number PCT/CN2022/116255, filed Aug. 31, 2022, which claims priority to Chinese patent application No. 202111540231.8, filed Dec. 16, 2021. The contents of these applications are incorporated herein by reference in their entirety.

TECHNICAL FIELD

The present disclosure belongs to the technical field of cathode materials for batteries, and particularly relates to a high-nickel sodium ion cathode material and a preparation method therefor and a battery.

BACKGROUND

Lithium-ion and sodium-ion batteries are popular in the current market of batteries for electric vehicles and energy storage due to high energy density as well as excellent power characteristics and stability thereof. Specifically, cathode materials with fast ion diffusion rate, and anode materials with smaller structural change and lower voltage are the most important aspects to realize performance of high-power and high-performance batteries. Although sodium has the basic advantage of lower price, the high specific capacity and reversible cycle life of the sodium ion batteries are still inferior to those of lithium ion batteries, because the chemical compositions and the crystal structures of the cathode materials of sodium ion batteries are different from those of the lithium ion batteries. One of the most promising ways to solve the above-described problems is to develop high-nickel sodium ion batteries.

However, the currently available high-nickel sodium ion batteries have obvious shortcomings, such as the disordering effect of cations such as high nickel and low manganese and cobalt, which reduces the diffusion rate of sodium ions, resulting in poor performance during discharge. After the material is sintered and cooled down, the high-nickel sodium ion cathode material in the battery responses quickly to an external environment in contact, easily reacts with $H_2O$ and $CO_2$ in the environment to generate $Na_2CO_3$ and $NaOH$, and $NaOH$ is dehydrated to form $Na_2O$. $Na_2CO_3$, $NaOH$ and $Na_2O$ will form a passivation layer on the cathode surface, further hindering the diffusion of the sodium ions at an interface between the material and the electrolytic solution, increasing the impedance of an interface between the material and the electrolytic solution, and easily leading to the decline of electrochemical performances of the battery. Therefore, this greatly limits the potential application of the sodium ion cathode materials.

SUMMARY

The present disclosure aims at solving at least one of the technical problems present in the prior art. Therefore, the present disclosure provides a high-nickel sodium ion cathode material and a preparation method therefor and a battery. The high-nickel sodium ion cathode material has good electrochemical performances and is beneficial to the application of the high-nickel sodium ion cathode material in a battery.

The above-mentioned technical objectives of the present disclosure are achieved by the following technical solutions.

A high-nickel sodium ion cathode material is provided, and a chemical formula of the high-nickel sodium ion cathode material is $NaNi_aCo_bMn_cO_2 \cdot fCNP-Al/tMVO_x$, wherein $a+b+c=1$, $0.5 \leq a < 1$, $0 < b \leq 0.25$, $a/b \geq 2.5$, $0 < c \leq 0.3$, $0 < t \leq 0.1$, $0 < f \leq 0.1$, and M is at least one of sodium, copper, zinc, zirconium or ammonium.

Preferably, $MVO_x$ is at least one of vanadate, metavanadate or pyrovanadate.

Further preferably, $MVO_x$ is at least one of sodium vanadate, sodium metavanadate, sodium pyrovanadate, copper vanadate, copper metavanadate, copper pyrovanadate, zinc vanadate, zinc metavanadate, zinc pyrovanadate, zirconium vanadate, zirconium metavanadate, zirconium pyrovanadate, ammonium vanadate, ammonium metavanadate or ammonium pyrovanadate.

Preferably, CNP—Al (carbon nano aluminum) in $NaNi_aCo_bMn_cO_2 \cdot fCNP-Al/tMVO_x$ is constituted by mixing a carbon nano powder, an aluminum source and a dispersing agent. A mass ratio of the aluminum source to the carbon nano powder is (0.1 to 30):(40 to 150).

Preferably, CNP—Al is prepared by mixing the carbon nano powder with the dispersing agent, then with the aluminum source, and then treating the mixture at 900° C. to 1,300° C. for 3 hours to 12 hours under a protective atmosphere.

Preferably, CNP—Al contains $Al_4C_3$.

Preferably, the aluminum source is at least one of aluminum hydroxide, aluminum acetate, aluminum chloride, aluminum sulfate, aluminum nitrate and aluminum fluoride.

Preferably, the dispersing agent is at least one of polyethylene glycol, methylated cellulose, acrylic acid, sodium silicate, methanol, ethanol and propanol.

Preferably, a particle size D50 of $NaNi_aCo_bMn_cO_2 \cdot fCNP-Al/tMVO_x$ ranges from 1 μm to 10 μm.

Preferably, a particle size $D_{max}$ of $NaNi_aCo_bMn_cO_2 \cdot fCNP-Al/tMVO_x$ ranges from 30 μm to 100 μm.

Preferably, a hardness (HB) of $NaNi_aCo_bMn_cO_2 \cdot fCNP-Al/tMVO_x$ ranges from 100 to 500.

Preferably, a specific surface area BET of $NaNi_aCo_bMn_cO_2 \cdot fCNP-Al/tMVO_x$ ranges from 0.2 m²/g to 3 m²/g.

Preferably, a tap density of $NaNi_aCo_bMn_cO_2 \cdot fCNP-Al/tMVO_x$ ranges from 2.5 m³/g to 4.5 m³/g.

A preparation method for the high-nickel sodium ion cathode material as described above, includes the following steps of: mixing a sodium source and carbon nano aluminum with a material of nickel, cobalt and manganese to obtain a mixture, subjecting the mixture to drying and dewatering, first-stage calcination, and annealing, and then mixing with $MVO_x$ and performing second-stage calcination on the mixture to obtain the cathode material.

Preferably, after the second-stage calcination, the method further includes a step of removing residual sodium from the high-nickel sodium ion cathode material to form a high-nickel sodium ion cathode material coated with sodium salt.

Preferably, the high-nickel sodium ion cathode material after the second-stage calcination is put into an alcohol solution, added with a sodium remover for stirring and standing, then subjected to hydrothermal drying to obtain the high-nickel sodium ion cathode material coated with the sodium salt.

Preferably, the sodium remover is ammonium sulfate of 0.001 M to 0.2 M or ammonium bisulfate of 0.001 M to 0.2 M.

Preferably, an addition amount of the sodium remover accounts for 0.001 wt % to 10 wt % of the high-nickel sodium ion cathode material.

Further preferably, the addition amount of the sodium remover accounts for 0.1 wt % to 2 wt % of the high-nickel sodium ion cathode material.

Preferably, the sodium source is at least one of sodium hydroxide, sodium acetate, sodium oxalate, sodium phosphate or sodium carbonate.

Preferably, the material of nickel, cobalt and manganese is obtained by recycling a waste ternary lithium battery.

Preferably, a method for recycling the waste ternary lithium battery includes: subjecting a ternary cathode material obtained by recycling a waste ternary lithium battery to acid leaching, aluminum removal, copper removal and extraction to obtain a mixture containing nickel, cobalt, and manganese, measuring a ratio of nickel, to cobalt, and to manganese in the mixture containing nickel, cobalt, and manganese, adding a supplement and the dispersing agent mentioned above into a mixed solution containing nickel, cobalt, and manganese, fully stirring the solution to obtain a homogeneous solution, keeping the temperature constant, adding a precipitant, stirring to completely precipitate and standing to obtain the material of nickel, cobalt and manganese.

Preferably, the mixture containing nickel, cobalt, and manganese is at least one of a mixed salt solution of nickel sulfate, cobalt sulfate, and manganese sulfate, a mixed salt solution of nickel nitrate, cobalt nitrate, and manganese nitrate or a mixed salt solution of nickel chloride, cobalt chloride, and manganese chloride.

Preferably, the supplement is at least one of nickel sulfate, nickel nitrate, manganese sulfate and manganese nitrate.

Preferably, the precipitant is at least one of carbonic acid, carbon dioxide, sodium carbonate, potassium carbonate, sodium bicarbonate, ammonium carbonate, ammonium bicarbonate and lithium carbonate.

Preferably, the first-stage calcination is carried out at 400° C. to 900° C., and lasts for 5 hours to 12 hours; the second-stage calcination is carried out at 600° C. to 1,000° C., and lasts for 5 hours to 16 hours.

A battery includes the high-nickel sodium ion cathode material as described above.

The present disclosure has the beneficial effects as follows.

(1) The high-nickel sodium ion cathode material of the present disclosure contains $MVO_x$, so that $Na^+/Ni^{2+}$ disordering can be suppressed, the structural defects of the existing high-nickel sodium ion cathode material can be overcome, and a conductivity of an interface between nickel and an electrolytic solution can be improved. Meanwhile, CNP—Al in the high-nickel sodium ion cathode material of the present disclosure can increase the hardness and strength of the high-nickel sodium ion cathode material of the present disclosure due to $Al_4C_3$, and can cooperate with $MVO_x$ to improve the electrochemical performance of the high-nickel sodium ion cathode material, which is beneficial to the application of the high-nickel sodium ion cathode material in batteries.

(2) In the process of preparing the high-nickel sodium ion cathode material of the present disclosure, a multifunctional coating layer may be created on a surface of the high-nickel sodium ion cathode material by adding the sodium remover (ammonium sulfate/ammonium bisulfate), so that the performance of the high-nickel sodium ion cathode material can be further optimized. On one hand, the ammonium sulfate/ammonium bisulfate removes residual alkaline substances of $Na_2CO_3$, NaOH and $Na_2O$ in an upper layer of the surface of the material, so that the removed alkaline substances of $Na_2CO_3$, NaOH and $Na_2O$ are transformed into a more stable sodium salt coating layer; on the other hand, the sodium salt coating layer will be better directly transformed into a sodium salt coating layer which is beneficial to the conduction of $Na^+$, thus improving the structural stability of the material and enhancing the transfer of $Na^+$ at the interface, improving the diffusion of sodium ions at the interface between the material and the electrolytic solution, and increasing a specific capacity, so that the high-nickel sodium ion cathode material has better cycle stability, stability of surface structure and good electrochemical performance.

(3) The material of nickel, cobalt and manganese used in the manufacturing process of the high-nickel sodium ion cathode material of the present disclosure is obtained by recycling the waste ternary lithium battery, thereby changing the waste material into things of value and effectively reducing environmental pollution.

DETAILED DESCRIPTION OF EMBODIMENTS

Figure 1:
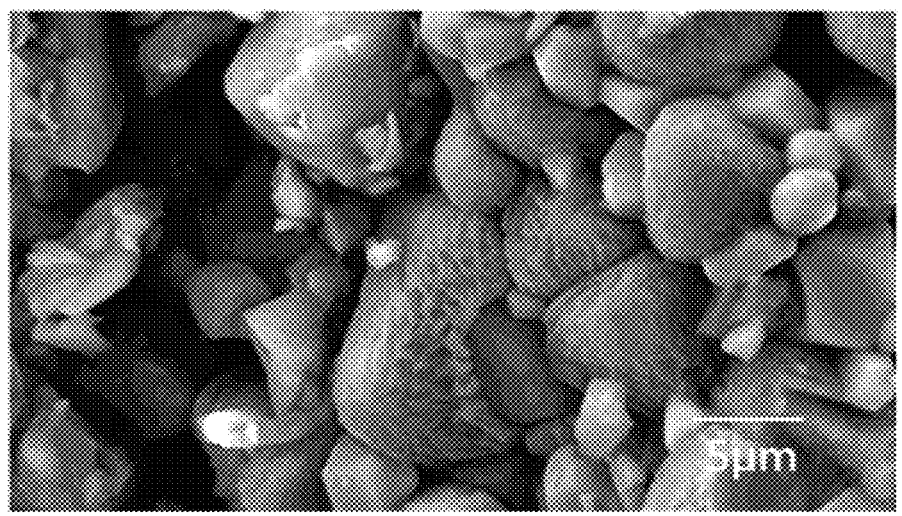
FIG. 1 is a SEM image of a high-nickel sodium ion cathode material of Example 1.

The present disclosure will be further described in detail below with reference to the specific examples.

Example 1

A high-nickel sodium ion cathode material had a chemical formula of $NaNi_{0.8}Co_{0.1}Mn_{0.1}O_2 \cdot 0.059 CNP—Al/0.03 NH_4VO_3$.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding nickel sulfate of 0.011 M, cobalt sulfate of 0.002 M and manganese sulfate of 0.012 M into the mixed salt solution of nickel sulfate, cobalt sulfate, and manganese sulfate, then adding 40 mL of methylated cellulose, sufficient stirring, keeping the temperature constant at 45° C., adding sodium carbonate and stirring until complete precipitation, and then standing for 3 hours to obtain the material of nickel, cobalt and manganese.

(2) Preparing CNP—Al: dispersing 4 g of carbon nano powder in 30 mL of polyethylene glycol, adding 75 mL of aluminum chloride solution of 0.47 M for mixing, sending the mixture to an electric furnace and introducing Ar to treat the mixture at 940° C. for 6 hours to obtain 5.5 g of CNP—Al containing $Al_4C_3$.

(3) Synthesizing $NaNi_{0.8}Co_{0.1}Mn_{0.1}O_2 \cdot 0.059CNP\text{—}Al/0.03NH_4VO_3$: mixing, ball-milling, stirring, drying and dehydrating 35 g of sodium hydroxide, 46.17 g of the material of nickel, cobalt and manganese prepared in step (1) and 4.7 g of CNP—Al prepared in step (2), sending the mixture to an electric furnace for first-stage calcination at 540° C. and keeping the temperature for 8 hours and then annealing, then adding 2.4 g of $NH_4VO_3$ for mixing, ball-milling and second-stage calcination at 740° C. and keeping the temperature for 10 hours to obtain the high-nickel sodium ion cathode material, $NaNi_{0.8}Co_{0.1}Mn_{0.1}O_2 \cdot 0.059CNP\text{—}Al/0.03NH_4VO_3$.

(4) Removing sodium and coating with sodium salt: putting 20 g of the high-nickel sodium ion cathode material prepared in step (3) into a beaker filled with 55 mL of polyethylene glycol, adding 25 mL of ammonium bisulfate solution of 0.019 M, stirring vigorously and then standing, removing a supernatant liquid, cleaning, and then placing a solid at lower layer in a microwave heating device for drying at 180° C. for 42 minutes, then dehydrating, dealcoholizing and deaminating to obtain the high-nickel sodium ion cathode material coated with the sodium salt, $NaNi_{0.8}Co_{0.1}Mn_{0.1}O_2 \cdot 0.059CNP\text{—}Al/0.03NH_4VO_3$.

A principle of forming the sodium salt coating was shown in reaction formulae (1) to (7):(1) to (2) showed that sodium oxide was obtained by heating and dehydrating sodium hydroxide and sodium carbonate was obtained by reacting sodium hydroxide with carbon dioxide, (3) to (4) showed decomposition reaction of ammonium sulfate, and (5) to (7) showed reaction formulas of ammonium bisulfate and sulfuric acid reacted respectively with sodium hydroxide, sodium oxide and sodium carbonate to obtain sodium sulfate, wherein the ammonium bisulfate and sulfuric acid were obtained by decomposition reaction of ammonium sulfate.

$$2NaOH \longrightarrow Na_2O + H_2O \tag{1}$$

$$2NaOH + CO_2 \longrightarrow Na_2CO_3 + H_2O \tag{2}$$

$$(NH_4)_2SO_4 \longrightarrow NH_4HSO_4 + NH_3 \tag{3}$$

$$NH_4HSO_4 \longrightarrow H_2SO_4 + NH_3 \tag{4}$$

$$NH_4HSO_4 + H_2SO_4 + 4NaOH \longrightarrow 2Na_2SO_4 + NH_3 + 4H_2O \tag{5}$$

$$NH_4HSO_4 + H_2SO_4 + 2Na_2CO_3 \longrightarrow 2Na_2SO_4 + NH_3 + 2H_2O + 2CO_2 \tag{6}$$

$$NH_4HSO_4 + H_2SO_4 + 2Na_2O \longrightarrow 2Na_2SO_4 + NH_3 + 2H_2O \tag{7}$$

Example 2

A high-nickel sodium ion cathode material had a chemical formula of $NaNi_{0.74}Co_{0.16}Mn_{0.1}O_2 \cdot 0.045CNP\text{—}Al/0.02NH_4VO_3$.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding cobalt sulfate of 0.09 M and manganese sulfate of 0.02 M into the mixed salt solution of nickel sulfate, cobalt sulfate, and manganese sulfate, then adding 40 mL of methylated cellulose, sufficient stirring, keeping the temperature constant at 45° C., adding sodium carbonate and stirring until complete precipitation, and then standing for 3 hours to obtain the material of nickel, cobalt and manganese.

(2) Preparing CNP—Al: dispersing 4 g of carbon nano powder in 48 mL of polyethylene glycol, adding 80 mL of aluminum chloride solution of 0.47 M for mixing, sending the mixture to an electric furnace and introducing Ar to treat the mixture at 940° C. for 6 hours to obtain 5.4 g of CNP—Al containing $Al_4C_3$.

(3) Synthesizing $NaNi_{0.74}Co_{0.16}Mn_{0.1}O_2 \cdot 0.045CNP\text{—}Al/0.02NH_4VO_3$: mixing, ball-milling, stirring, drying and dehydrating 51 g of sodium hydroxide, 55.4 g of the material of nickel, cobalt and manganese prepared in step (1) and 4.8 g of CNP—Al prepared in step (2), sending the mixture to an electric furnace for first-stage calcination at 540° C. and keeping the temperature for 8 hours and then annealing, then adding 2.1 g of $NH_4VO_3$ for mixing, ball-milling and second-stage calcination at 740° C. and keeping the temperature for 10 hours to obtain the high-nickel sodium ion cathode material, $NaNi_{0.74}Co_{0.16}Mn_{0.1}O_2 \cdot 0.045CNP\text{—}Al/0.02NH_4VO_3$.

(4) Removing sodium and coating with sodium salt: putting 20 g of the high-nickel sodium ion cathode material prepared in step (3) into a beaker filled with 55 mL of polyethylene glycol, adding 25 mL of ammonium sulfate solution of 0.019 M, stirring vigorously and then standing, removing a supernatant liquid, cleaning, and then placing a solid at lower layer in a microwave heating device for drying at 180° C. for 42 minutes, then dehydrating, dealcoholizing and deaminating to obtain the high-nickel sodium ion cathode material coated with the sodium salt, $NaNi_{0.74}Co_{0.16}Mn_{0.1}O_2 \cdot 0.045CNP\text{—}Al/0.02NH_4VO_3$.

Example 3

A high-nickel sodium ion cathode material had a chemical formula of $NaNi_{0.68}Co_{0.23}Mn_{0.09}O_2 \cdot 0.037CNP\text{—}Al/0.015NaVO_3$.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding cobalt sulfate of 0.143 M and manganese sulfate of 0.018 M into the mixed salt solution of nickel sulfate, cobalt sulfate, and manganese sulfate, then adding 50 mL of acrylic acid, sufficient stirring, keeping the temperature constant at 45° C., adding ammonium carbonate and stirring until complete precipitation, and then standing for 3 hours to obtain the material of nickel, cobalt and manganese.

(2) Preparing CNP—Al: dispersing 6.5 g of carbon nano powder in 50 mL of polyethylene glycol, adding 70 mL of aluminum chloride solution of 0.47 M for mixing, sending the mixture to an electric furnace and introducing Ar to treat the mixture at 1,284° C. for 6 hours to obtain 7.9 g of CNP—Al containing $Al_4C_3$.

(3) Synthesizing $NaNi_{0.68}Co_{0.23}Mn_{0.09}O_2 \cdot 0.037CNP$—Al/0.015NaVO$_3$: mixing, ball-milling, stirring, drying and dehydrating 122.0 g of sodium acetate, 60.1 g of the material of nickel, cobalt and manganese prepared in step (1) and 6.8 g of CNP—Al prepared in step (2), sending the mixture to an electric furnace for first-stage calcination at 590° C. and keeping the temperature for 6 hours and then annealing, then adding 2.7 g of NaVO$_3$ for mixing, ball-milling and second-stage calcination at 680° C. and keeping the temperature for 16 hours to obtain the high-nickel sodium ion cathode material, $NaNi_{0.68}Co_{0.23}Mn_{0.09}O_2 \cdot 0.037CNP$—Al/0.015NaVO$_3$.

(4) Removing sodium and coating with sodium salt: putting 20 g of the high-nickel sodium ion cathode material prepared in step (3) into a beaker filled with 45 mL of polyethylene glycol, adding 25 mL of ammonium sulfate solution of 0.019 M, stirring vigorously and then standing, removing a supernatant liquid, cleaning, and then placing a solid at lower layer in a microwave heating device for drying at 180° C. for 42 minutes, then dehydrating, dealcoholizing and deaminating to obtain the high-nickel sodium ion cathode material coated with the sodium salt, $NaNi_{0.68}Co_{0.23}Mn_{0.09}O_2 \cdot 0.037CNP$—Al/0.015NaVO$_3$.

Example 4

A high-nickel sodium ion cathode material had a chemical formula of $NaNi_{0.55}Co_{0.18}Mn_{0.27}O_2 \cdot 0.034CNP$—Al/0.02NaVO$_3$.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding cobalt sulfate of 0.2 M and manganese sulfate of 0.25 M into the mixed salt solution of nickel sulfate, cobalt sulfate, and manganese sulfate, then adding 50 mL of acrylic acid, sufficient stirring, keeping the temperature constant at 45° C., adding ammonium carbonate and stirring until complete precipitation, and then standing for 3 hours to obtain the material of nickel, cobalt and manganese.

(2) Preparing CNP—Al: dispersing 5.3 g of carbon nano powder in 40 mL of polyethylene glycol, adding 60 mL of aluminum chloride solution of 0.47 M for mixing, sending the mixture to an electric furnace and introducing Ar to treat the mixture at 1,284° C. for 6 hours to obtain 6.4 g of CNP—Al containing $Al_4C_3$.

(3) Synthesizing $NaNi_{0.55}Co_{0.18}Mn_{0.27}O_2 \cdot 0.034CNP$—Al/0.02NaVO$_3$: mixing, ball-milling, stirring, drying and dehydrating 98.8 g of sodium acetate, 55.1 g of the material of nickel, cobalt and manganese prepared in step (1) and 5.2 g of CNP—Al prepared in step (2), sending the mixture to an electric furnace for first-stage calcination at 590° C. and keeping the temperature for 6 hours and then annealing, then adding 3.1 g of NaVO$_3$ for mixing, ball-milling and second-stage calcination at 680° C. and keeping the temperature for 16 hours to obtain the high-nickel sodium ion cathode material, $NaNi_{0.55}Co_{0.18}Mn_{0.27}O_2 \cdot 0.034CNP$—Al/0.02NaVO$_3$.

(4) Removing sodium and coating with sodium salt: putting 20 g of the high-nickel sodium ion cathode material prepared in step (3) into a beaker filled with 45 mL of polyethylene glycol, adding 25 mL of ammonium sulfate solution of 0.019 M, stirring vigorously and then standing, removing a supernatant liquid, cleaning, and then placing a solid at lower layer in a microwave heating device for drying at 180° C. for 42 minutes, then dehydrating, dealcoholizing and deaminating to obtain the high-nickel sodium ion cathode material coated with the sodium salt, $NaNi_{0.55}Co_{0.18}Mn_{0.27}O_2 \cdot 0.034CNP$—Al/0.02NaVO$_3$.

Comparative Example 1

A high-nickel sodium ion cathode material had a chemical formula of $NaNi_{0.8}Co_{0.1}Mn_{0.1}O_2 \cdot 0.059CNP$—Al/0.03NH$_4$VO$_3$.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding nickel sulfate of 0.011 M, cobalt sulfate of 0.002 M and manganese sulfate of 0.012 M into the mixed salt solution of nickel sulfate, cobalt sulfate, and manganese sulfate, then adding 40 mL of methylated cellulose, sufficient stirring, keeping the temperature constant at 45° C., adding sodium carbonate and stirring until complete precipitation, and then standing for 3 hours to obtain the material of nickel, cobalt and manganese.

(2) Preparing CNP—Al: dispersing 4 g of carbon nano powder in 30 mL of polyethylene glycol, adding 75 mL of aluminum chloride solution of 0.47M for mixing, sending the mixture to an electric furnace and introducing Ar to treat the mixture at 940° C. for 6 hours to obtain 5.5 g of CNP—Al containing $Al_4C_3$.

(3) Synthesizing $NaNi_{0.8}Co_{0.1}Mn_{0.1}O_2 \cdot 0.059CNP$—Al/0.03NH$_4$VO$_3$: mixing, ball-milling, stirring, drying and dehydrating 35 g of sodium hydroxide, 46.17 g of the material of nickel, cobalt and manganese prepared in step (1) and 4.7 g of CNP—Al prepared in step (2), sending the mixture to an electric furnace for first-stage calcination at 540° C. and keeping the temperature for 8 hours and then annealing, then adding 2.4 g of NH$_4$VO$_3$ for mixing, ball-milling and second-stage calcination at 740° C. and keeping the temperature for 10 hours to obtain the high-nickel sodium ion cathode material, $NaNi_{0.8}Co_{0.1}Mn_{0.1}O_2 \cdot 0.059CNP$—Al/0.03NH$_4$VO$_3$.

Comparative Example 2

A high-nickel sodium ion cathode material had a chemical formula of $NaNi_{0.68}Co_{0.23}Mn_{0.09}O_2 \cdot 0.037CNP$—Al.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding cobalt sulfate of 0.143 M and manganese sulfate of 0.018 M into the mixed salt solution of nickel sulfate, cobalt sulfate, and manganese sulfate, then adding 50 mL of acrylic acid, sufficient stirring, keeping the temperature constant at 45° C., adding sodium carbonate and stirring until complete precipitation, and then standing for 3 hours to obtain the material of nickel, cobalt and manganese.

(2) Preparing CNP—Al: dispersing 6.5 g of carbon nano powder in 50 mL of polyethylene glycol, adding 70 mL of aluminum chloride solution of 0.47 M for mixing, sending the mixture to an electric furnace and introducing Ar to treat the mixture at 1,284° C. for 6 hours to obtain 7.9 g of CNP—Al containing $Al_4C_3$.

(3) Synthesizing $NaNi_{0.68}Co_{0.23}Mn_{0.09}O_2 \cdot 0.037CNP$—Al: mixing, ball-milling, stirring, drying and dehydrating 122.0 g of sodium acetate, 60.1 g of the material of nickel, cobalt and manganese prepared in step (1) and 6.8 g of CNP—Al prepared in step (2), sending the mixture to an electric furnace for first-stage calcination at 590° C. and keeping the temperature for 6 hours, annealing, and then performing second-stage calcination at 680° C. and keeping the temperature for 16 hours to obtain the high-nickel sodium ion cathode material, $NaNi_{0.68}Co_{0.23}Mn_{0.09}O_2 \cdot 0.037CNP$—Al.

(4) Removing sodium and coating with sodium salt: putting 20 g of the high-nickel sodium ion cathode material prepared in step (3) into a beaker filled with 45 mL of polyethylene glycol, adding 25 mL of ammonium sulfate solution of 0.019 M, stirring vigorously and then standing, removing a supernatant liquid, cleaning, and then placing a solid at lower layer in a microwave heating device for drying at 180° C. for 42 minutes, then dehydrating, dealcoholizing and deaminating to obtain the high-nickel sodium ion cathode material coated with the sodium salt, $NaNi_{0.68}Co_{0.23}Mn_{0.09}O_2 \cdot 0.037CNP$—Al.

Comparative Example 3

A high-nickel sodium ion cathode material had a chemical formula of $NaNi_{0.68}Co_{0.23}Mn_{0.09}O_2/0.015NaVO_3$.

A preparation method for the above-described high-nickel sodium ion cathode material included the following steps.

(1) Preparing a material of nickel, cobalt and manganese: subjecting a ternary cathode material recovered from a waste ternary lithium battery to acid leaching, aluminum removal, copper removal and extraction to obtain a mixed salt solution of nickel sulfate, cobalt sulfate, and manganese sulfate, determining a molar ratio (0.965:0.12:0.11) of nickel, to cobalt, and to manganese in the mixed salt solution of nickel sulfate, cobalt sulfate, and manganese sulfate, putting 500 mL of the mixed salt solution into a beaker, adding cobalt sulfate of 0.143 M and manganese sulfate of 0.018 M into the mixed salt solution of nickel sulfate, cobalt sulfate, and manganese sulfate, then adding 50 mL of acrylic acid, sufficient stirring, keeping the temperature constant at 45° C., adding sodium carbonate and stirring until complete precipitation, and then standing for 3 hours to obtain the material of nickel, cobalt and manganese.

(2) Synthesizing $NaNi_{0.68}Co_{0.23}Mn_{0.09}O_2/0.015NaVO_3$: mixing, ball-milling, stirring, drying and dehydrating 122.0 g of sodium acetate, and 60.1 g of the material of nickel, cobalt and manganese prepared in step (1), sending the mixture to an electric furnace for first-stage calcination at 590° C. and keeping the temperature for 6 hours and then annealing, then adding 2.7 g of $NaVO_3$ for mixing, ball-milling and second-stage calcination at 680° C. and keeping the temperature for 16 hours to obtain the high-nickel sodium ion cathode material, $NaNi_{0.68}Co_{0.23}Mn_{0.09}O_2/0.015NaVO_3$.

(3) Removing sodium and coating with sodium salt: putting 20 g of the high-nickel sodium ion cathode material prepared in step (3) into a beaker filled with 45 mL of polyethylene glycol, adding 25 mL of ammonium sulfate solution of 0.019 M, stirring vigorously and then standing, removing a supernatant liquid, cleaning, and then placing a solid at lower layer in a microwave heating device for drying at 180° C. for 42 minutes, then dehydrating, dealcoholizing and deaminating to obtain the high-nickel sodium ion cathode material coated with the sodium salt, $NaNi_{0.68}Co_{0.23}Mn_{0.09}O_2/0.015NaVO_3$.

Test Example:

Particle sizes, hardness, BET and tap densities of the high-nickel sodium ion cathode material of Examples 1 to 4 and Comparative Examples 1 to 3 were measured respectively. Then, the high-nickel sodium ion cathode materials of Examples 1 to 4 and Comparative Examples 1 to 3 were mixed with acetylene black and polyvinylidene fluoride (PVDF) according to a mass ratio of 80:15:5 in a beaker, and then a small amount of NMP was added and ground into slurry. Then, the slurry was evenly coated on an aluminum foil by a coater with a thickness of 120 am, put into a vacuum drying oven and kept at 100° C. for 8 hours, and then punched into a positive plate with a diameter of 16 mm (with a mass of active material being about 15 mg to 20 mg). An organic solution with 1.2 M of $NaPF_6$ in ethylene carbonate was used as an electrolytic solution, and a metal sodium sheet was used as an anode, which were assembled into a CR2025 button battery in a glove box filled with Ar. A BTS battery tester was used to test the performance of the battery, wherein a test voltage ranged from 2.5 V to 4.0 V, a current density was 2 C, and a scanning rate was 0.1 mV/s. The test results were shown in Table 1.

TABLE 1

| | Test results | | | | | | |
|---|---|---|---|---|---|---|---|
| Sample | Example 1 | Example 2 | Example 3 | Example 4 | Comparative Example 1 | Comparative Example 2 | Comparative Example 3 |
| $D_{50}$ (μm) | 6.49 | 6.66 | 6.86 | 6.75 | 6.85 | 6.13 | 6.17 |
| $D_{max}$ (μm) | 36.9 | 41.3 | 48.3 | 54.3 | 36.6 | 56.3 | 74.6 |

TABLE 1-continued

Test results

| Sample | | Example 1 | Example 2 | Example 3 | Example 4 | Comparative Example 1 | Comparative Example 2 | Comparative Example 3 |
|---|---|---|---|---|---|---|---|---|
| Hardness (HB) | | 124 | 121 | 124 | 128 | 96 | 94 | 87 |
| BET (m$^2$/g) | | 0.74 | 0.96 | 0.87 | 0.94 | 0.71 | 0.67 | 0.64 |
| Tap density (m$^3$/g) | | 3.6 | 3.7 | 3.5 | 3.5 | 3.3 | 3.3 | 3.2 |
| Specific discharge capacity (mAh·g$^{-1}$) | First time | 164.3 | 165.1 | 164.7 | 161.9 | 153.3 | 156.3 | 157.9 |
| | 100$^{th}$ time | 137.8 | 138.9 | 135 | 134.3 | 123.6 | 124.1 | 126.4 |
| | 150$^{th}$ time | 124.5 | 126.7 | 127.3 | 127.9 | 113.2 | 114.3 | 116.3 |
| Discharge/charge efficiency (%) | First time | 78.4 | 77.8 | 73.2 | 74.9 | 71.3 | 75.2 | 76.5 |
| | 100$^{th}$ time | 89.4 | 91.5 | 87.7 | 92.7 | 82.6 | 84.8 | 85.3 |
| | 150$^{th}$ time | 99.9 | 99.8 | 99.7 | 99.9 | 99.2 | 99.5 | 99.5 |

Meanwhile, the high-nickel sodium ion cathode material of Example 1 was subjected to a SEM test and a TEM test. The result of the SEM test was shown in FIG. 1, and the result of the TEM test was shown in FIG. 2. The high-nickel sodium ion cathode material of Comparative Example 1 was subjected to a TEM test, and the test result was shown in FIG. 3.

It can be seen from Table 1 that the first specific discharge capacity of the CR2025 button battery made of the high-nickel sodium ion cathode material of the present application can reach 161.9 mAh·g$^{-1}$ or more, and the specific discharge capacity after 150 cycles is still 124.5 mAh·g$^{-1}$ or more; and the first discharge/charge efficiency of the CR2025 button battery made of the high-nickel sodium ion cathode material of the present application can reach 73.2% or more, and the discharge/charge efficiency after 150 cycles can reach 99.7% or more.

Meanwhile, by comparing Example 1 and Comparative Example 1, it can be seen that when other conditions remain unchanged, the high-nickel sodium ion cathode material is not subjected to residual sodium removal at last, and the finally prepared high-nickel sodium ion cathode material has poorer specific discharge capacity and discharge/charge efficiency, which makes the cycle stability of the high-nickel sodium ion cathode material worse.

By comparing Example 3 and Comparative Examples 2 to 3, it can be seen that when other conditions remain unchanged, and the high-nickel sodium ion cathode material does not contain MVO$_x$ or CNP—Al, the hardness of the high-nickel sodium ion cathode material may decrease and the specific discharge capacity and discharge/charge efficiency thereof may be worse.

Moreover, it can be seen from FIG. 1 that the size of the high-nickel sodium ion cathode material of Example 1 is mainly 5 μm to 10 μm, the particles are relatively compact, and less high-nickel sodium ion cathode materials are dispersed.

Figure 2:
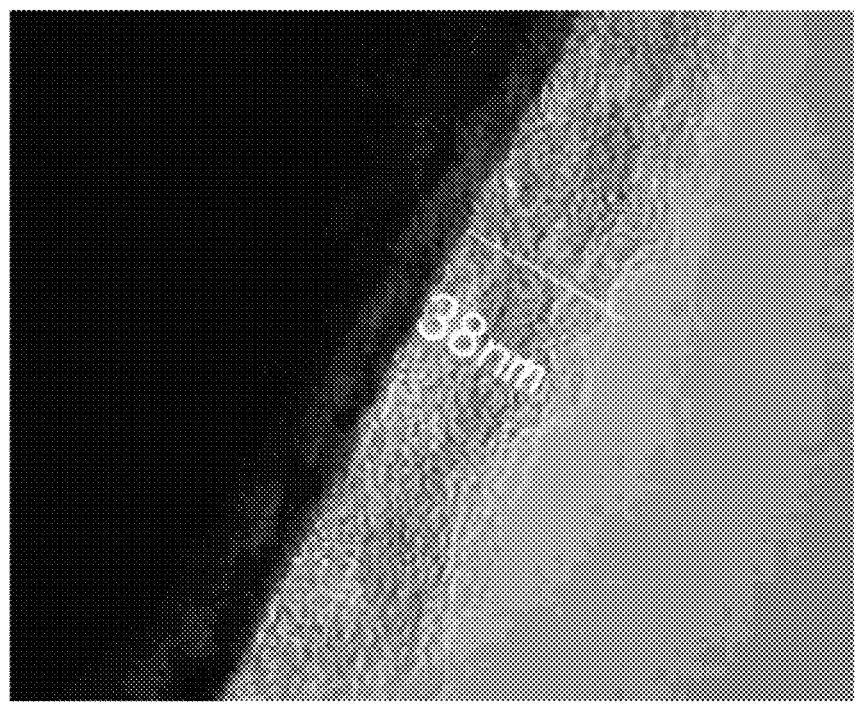
FIG. 2 is a TEM image of the high-nickel sodium ion cathode material of Example 1.
Figure 3:
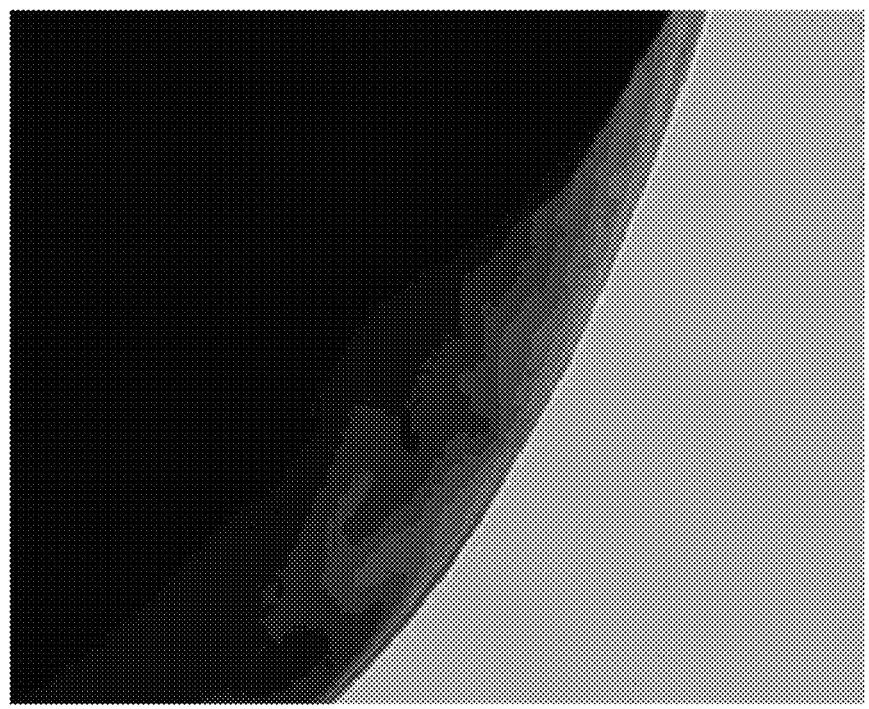
FIG. 3 is a TEM image of a high-nickel sodium ion cathode material of Comparative Example 1.

It can be seen from FIG. 2 that a 38 nm of coating layer is provided on the surface of the high-nickel sodium ion cathode material of Example 1, which can avoid structural defects and improve the electrochemical performance. It can be seen from FIG. 3 that the high-nickel sodium ion cathode material of Comparative Example 1 has a smooth surface without a coating layer.

The above-described examples are preferred embodiments of the present disclosure. However, the embodiments of the present disclosure are not limited to the above-described examples, and any other changes, modifications, substitutions, combinations, and simplifications made without departing from the spirit and principle of the present disclosure should be equivalent replacement modes, and are included in the protection scope of the present disclosure.

The invention claimed is:

1. A high-nickel sodium ion cathode material, wherein a chemical formula of the high-nickel sodium ion cathode material is NaNi$_a$Co$_b$Mn$_c$O$_2$·fCNP—Al/tMVO$_x$, wherein a+b+c=1, 0.5≤a<1, 0<b≤0.25, a/b≥2.5, 0<c≤0.3, 0<t≤0.1, 0<f≤0.1, and M is at least one of sodium, copper, zinc, zirconium or ammonium;
   wherein MVO$_x$ in NaNi$_a$Co$_b$Mn$_c$O$_2$·fCNP—Al/tMVO$_x$ is at least one of vanadate, metavanadate or pyrovanadate.

2. The high-nickel sodium ion cathode material according to claim 1, wherein CNP—Al in NaNi$_a$Co$_b$Mn$_c$O$_2$·fCNP—Al/tMVO$_x$ is constituted by mixing a carbon nano powder, an aluminum source and a dispersing agent.

3. The high-nickel sodium ion cathode material according to claim 2, wherein CNP—Al is prepared by mixing the carbon nano powder with the dispersing agent, then with the aluminum source, and then treating the mixture at 900° C. to 1,300° C. for 3 hours to 12 hours under a protective atmosphere.

4. The high-nickel sodium ion cathode material according to claim 3, wherein CNP—Al contains Al$_4$C$_3$.

5. A preparation method for the high-nickel sodium ion cathode material according to claim 1, comprising the following steps of: mixing a sodium source and carbon nano aluminum with a material of nickel, cobalt and manganese to obtain a mixture, subjecting the mixture to drying and dewatering, first-stage calcination, and annealing, and then mixing with MVO$_x$ and performing second-stage calcination on the mixture.

6. The preparation method for the high-nickel sodium ion cathode material according to claim 5, further comprising, after the second-stage calcination, a step of removing residual sodium from the high-nickel sodium ion cathode material to form a high-nickel sodium ion cathode material coated with sodium salt.

7. The preparation method for the high-nickel sodium ion cathode material according to claim 6, wherein the step of removing the residual sodium comprises: putting the high-nickel sodium ion cathode material after the second-stage calcination into an alcohol solution, adding a sodium remover, stirring and standing, then performing hydrothermal drying on the mixture to obtain the high-nickel sodium ion cathode material coated with the sodium salt.

8. The preparation method for the high-nickel sodium ion cathode material according to claim 5, wherein the material of nickel, cobalt and manganese is obtained by recycling a waste ternary lithium battery.

9. A battery, comprising the high-nickel sodium ion cathode material according to claim 1.

10. A preparation method for the high-nickel sodium ion cathode material according to claim 3, comprising the following steps of: mixing a sodium source and carbon nano aluminum with a material of nickel, cobalt and manganese to obtain a mixture, subjecting the mixture to drying and dewatering, first-stage calcination, and annealing, and then mixing with $MVO_x$ and performing second-stage calcination on the mixture.

11. A preparation method for the high-nickel sodium ion cathode material according to claim 3, comprising the following steps of: mixing a sodium source and carbon nano aluminum with a material of nickel, cobalt and manganese to obtain a mixture, subjecting the mixture to drying and dewatering, first-stage calcination, and annealing, and then mixing with $MVO_x$ and performing second-stage calcination on the mixture.

12. A preparation method for the high-nickel sodium ion cathode material according to claim 4, comprising the following steps of: mixing a sodium source and carbon nano aluminum with a material of nickel, cobalt and manganese to obtain a mixture, subjecting the mixture to drying and dewatering, first-stage calcination, and annealing, and then mixing with $MVO_x$ and performing second-stage calcination on the mixture.

13. The preparation method for the high-nickel sodium ion cathode material according to claim 6, wherein the material of nickel, cobalt and manganese is obtained by recycling a waste ternary lithium battery.

14. The preparation method for the high-nickel sodium ion cathode material according to claim 7, wherein the material of nickel, cobalt and manganese is obtained by recycling a waste ternary lithium battery.

15. A battery, comprising the high-nickel sodium ion cathode material according to claim 2.

16. A battery, comprising the high-nickel sodium ion cathode material according to claim 3.

17. A battery, comprising the high-nickel sodium ion cathode material according to claim 4.

* * * * *